United States Patent [19]
Hsieh

[11] Patent Number: 5,579,878
[45] Date of Patent: Dec. 3, 1996

[54] BI-DIRECTIONAL CLUTCH TYPE CHAIN PULLING DEVICE FOR ROLLING DOORS

[76] Inventor: Tsung-Wen Hsieh, No. 15, Sub-lane 3, Lane 217, Chung-Hsiao E. Road, Sec. 3, Taipei, Taiwan

[21] Appl. No.: 338,342

[22] Filed: Nov. 14, 1994

[51] Int. Cl.⁶ .............................. F16D 67/00; E05F 15/00
[52] U.S. Cl. .......................................... 192/8 R; 192/144
[58] Field of Search .............................. 192/7, 8 R, 144; 160/310; 49/139, 140

[56] References Cited

U.S. PATENT DOCUMENTS

| | | | |
|---|---|---|---|
| 2,670,065 | 2/1954 | Stevens | 49/140 X |
| 4,059,779 | 11/1977 | Wistinghausen | 192/8 X |
| 4,348,011 | 9/1982 | Honda | 192/8 R X |

*Primary Examiner*—Charles A. Marmor
*Assistant Examiner*—Saul Rodriguez
*Attorney, Agent, or Firm*—Bucknam and Archer

[57] ABSTRACT

A bi-directional clutch type chain pulling device for rolling doors for releasing the brake and rolling the door up by pulling the chain at an arbitrary direction has a chain sprocket which can be pulled by external force and which is pivoted thereon with a spring acted triggering plate, the sides of which are formed with a pair of branch legs and a projected actuating pin which is secured at an intermediate portion. A linkage pin is inserted into the rotating shaft and projects out. An intermediate disk has radially an elongate slide groove and has in the intermediate portion a cylinder having an inner hole, on the inner surface of the hole being provided with a friction ring which can be actuated via the actuating pin. A release lever mechanism including a brake release lever is provided having a pin secured to one end for insertion into the elongate slide groove, the other end being pivoted and having a pair of upwardly inclined wing plates secured to it for acting on an actuating lever fixed integrally with the cam pin of a drum brake assembly via an intermediate lever pivoted at one end.

6 Claims, 6 Drawing Sheets

5,579,878

BI-DIRECTIONAL CLUTCH TYPE CHAIN PULLING DEVICE FOR ROLLING DOORS

FIELD OF THE INVENTION

The present invention relates to a bi-directional clutch type chain pulling device for rolling doors and, in particular, to release and lift device for releasing the brake and lifting the rolling door by pulling the chain at an arbitrary direction.

BACKGROUND OF THE INVENTION

It is known that conventional electric rolling doors are essentially designed to include a motor-driven barrel, which is controlled to have the curtain of slats rolled up and wound around the barrel for opening the door during forward rotation; or to have the curtain pushed out for closing the door during reverse rotation. After the door has been opened or closed to its upper or lower dead position, the input current to the motor is cut off, a cam shaft which is acted upon by a spring pushes the brake shoes of a drum brake device open to have the motor shaft braked such that the door is held at its opened or closed condition. Under normal power supply, there are no significant disadvantages with the operation of conventional electric rolling doors. In case of power failure, however, when one wants to open the curtain after it has been closed, because of the inherent structure, the operator has to pull the brake release cable to pull the cam shaft of the braking device to have the brake released with one hand, and to pull the chain to rotate the rotating shaft so as to cause barrels to rotate and have the curtain rolled up with the other hand. Therefore, conventional electric rolling doors must be operated by using both hands under no power supply, which is rather undesirable such that improvements have yet to be made.

SUMMARY OF THE INVENTION

Accordingly, the object of the present invention is to provide a bi-directional clutch type chain pulling device for electric rolling doors during power off. Said device enables the electric rolling door to be operated in the same manner as conventional electric rolling doors under normal condition. During power off, however, by pulling the chain with only one hand at an arbitrary direction, the brake release lever mechanism can be actuated to release the brake and the curtain of slats is rolled up almost synchronously to open the door.

The bi-directional clutch type chain rolling device according to the present . invention comprises an intermediate disk actuated by a chain sprocket, said intermediate disk having an elongate slide groove slidably connected to one end of the brake release lever which is pivoted at another end, a pair of upwardly inclined actuating wing plates being secured at a portion adjacent the pivoted end on the release lever, an intermediate lever pivoted at one end and allowing contact at an intermediate portion with either wing plate, the other end thereof being in contact with an actuating lever connected with the cam pin of a drum brake assembly. Therefore, with the present invention under normal operation, when the electric rolling door is closed, the input current to the solenoid valve is cut off by conventional means such as a microswitch, the plunger of the solenoid valve enters into brake releasing position, and a return spring acts on the cam pin of the brake assembly such that a pair of braking shoes of the drum brake assembly are pushed open to exert brake force on the motor shaft. On the other hand, when one wants to open the rolling door in case of power failure, the operator can simply pull at will the chain wound around the chain sprocket, causing the sprocket to rotate. After the chain sprocket has been rotated for an angle, an actuating pin fixed on the chain sprocket may come into contact with a friction ring received in the intermediate disk, thus causing the intermediate disk to rotate along with it. After both have been rotated together for an angle, the elongate slide groove on the intermediate disk acting on the brake release lever and causing it to swing, one of wing plates on the release lever will finally press against the intermediate lever, causing the intermediate lever to push the actuating lever which is always in contact therewith to resist the spring, causing the cam pin to turn from a brake-on position to a brake-off position and stay in this brake-off position as the operator keeps applying force to pull the chain, and with the cam pin having been rotated to a limit position, the movement of the intermediate disk, the release lever, and the actuating lever will be blocked and prevented from moving further. When the operator keeps on applying force to pull the chain, the friction force between the friction ring and the intermediate disk will be surpassed such that the chain sprocket goes to rotate alone. Then, a triggering plate provided on the chain sprocket is deflected to become coupled with the rotating shaft of the motor, thus actuating the rotating shaft to rotate together. As a result, the operator can open the door by simply pulling the chain to release the brake on the rotating shaft, causing the barrel to rotate and roll up the curtain.

Further object of the present invention is to provide a bi-directional clutch type chain pulling device for hand-operated rolling doors, wherein by pulling the chain with one hand at an arbitrary direction, releasing brake and then rolling up curtain can be performed in order to open the door.

Another object of the present invention is to provide a bi-directional clutch type chain pulling device for electric rolling doors wherein the motor shaft will be braked again by the braking device at any time when the operator stops pulling the chain, and when the chain is pulled further, door will continue to be opened wider again in the above described manner.

BRIEF DESCRIPTION OF THE DRAWINGS

The above objects and functions of the present invention can be further understood from the following description of embodiments thereof in conjunction of the accompanying drawings.

DETAILED DESCRIPTION OF THE INVENTION

Figure 1:
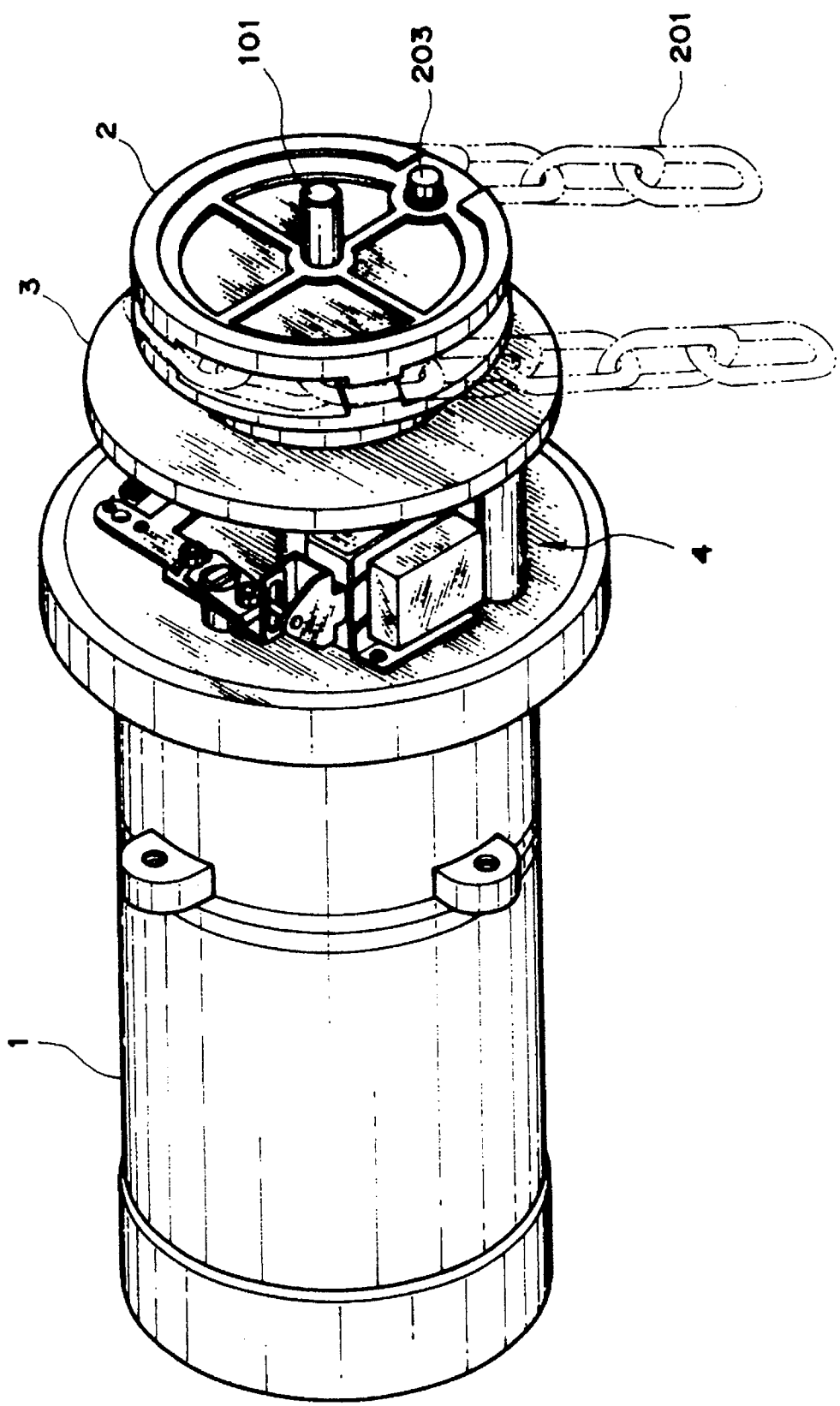
FIG. 1 is a perspective view of the first embodiment of the present invention for use with a conventional electric rolling door wherein the curtain of slates and the adjacent structures are omitted.
Figure 2:
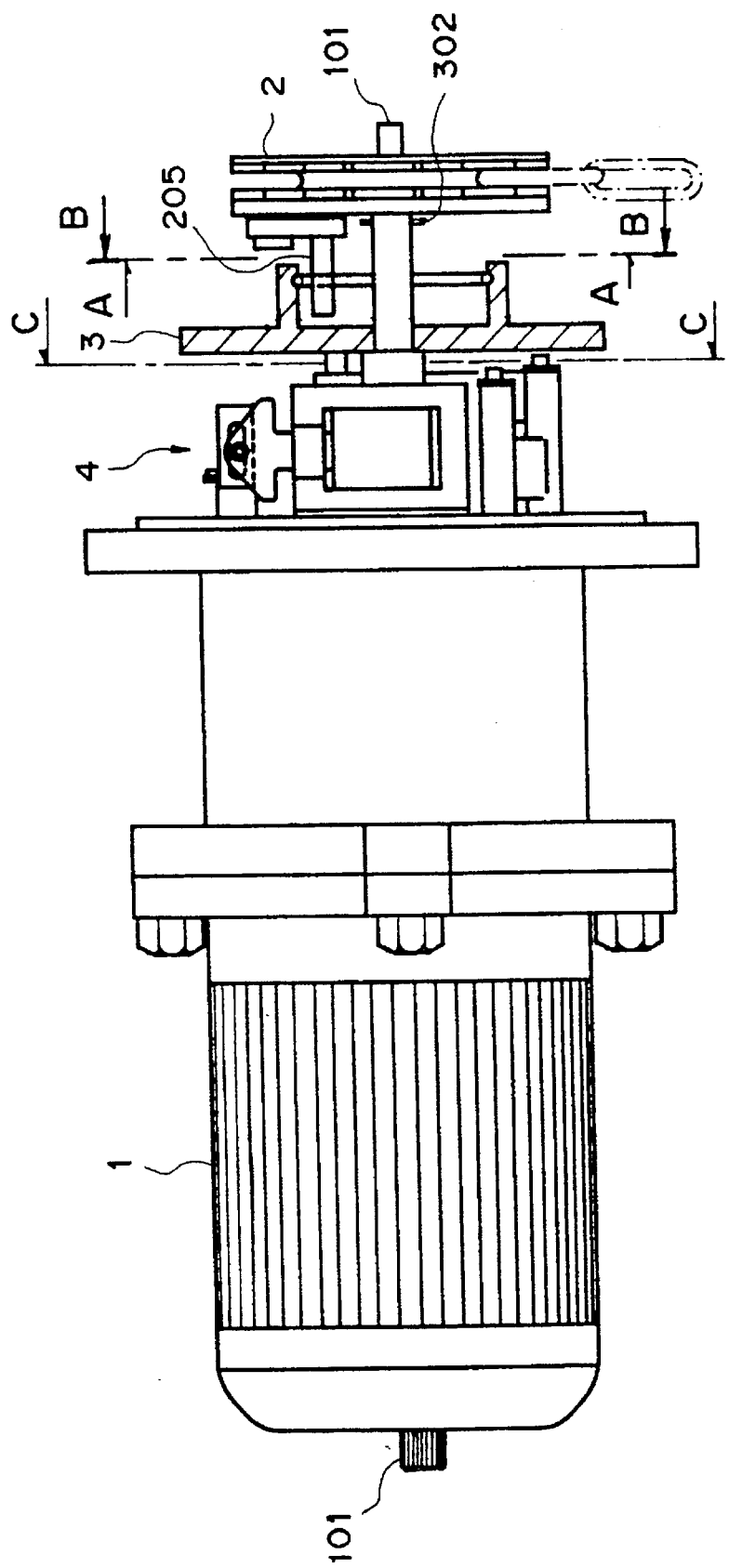
FIG. 2 is a front view of the clutch type device of FIG. 1 wherein the structure of the portion related to the present invention is sectioned off.
Figure 7:
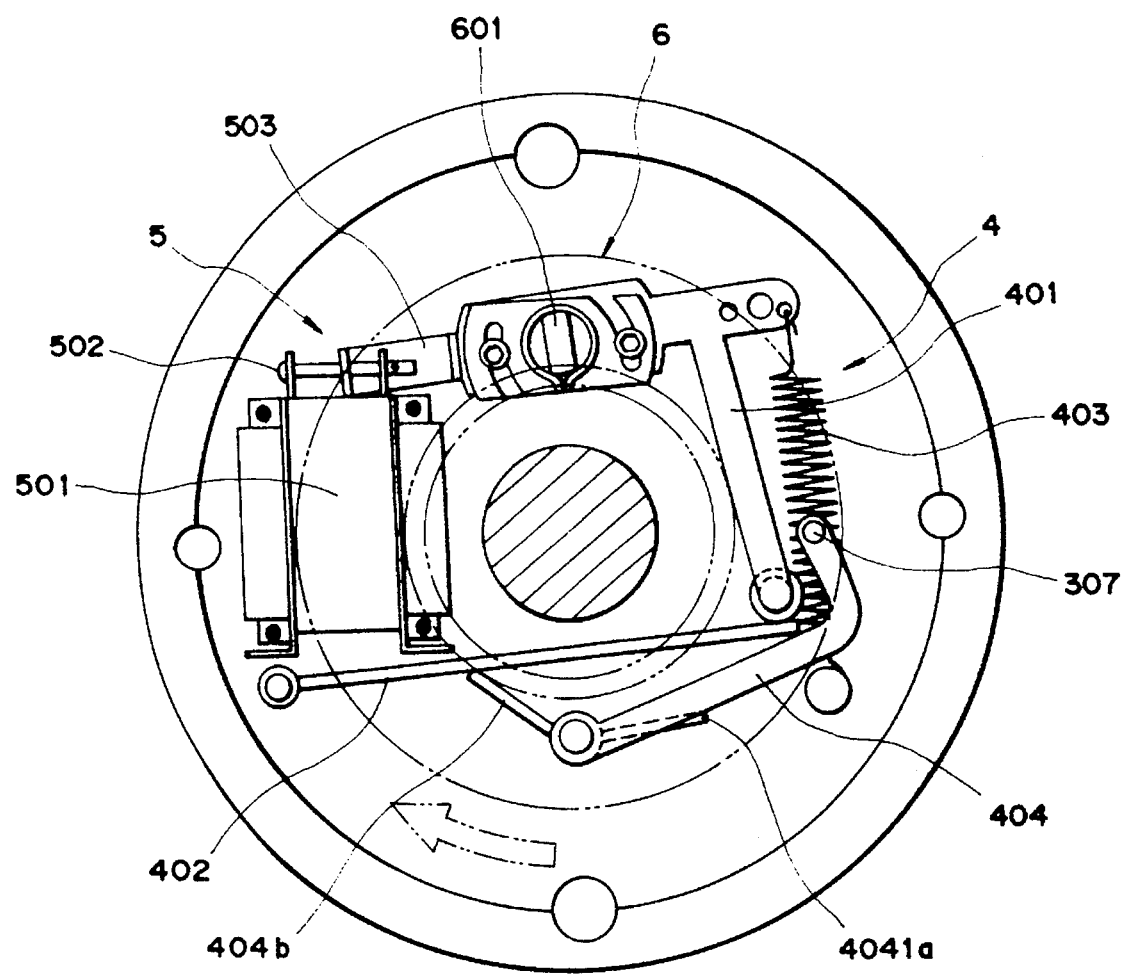
FIG. 7 is a view taken in direction C—C of FIG. 2 showing the brake is in a release state during actuation.

Referring first to FIGS. 1, 2 and 7, the bi-directional clutch type chain pulling device for electric rolling doors of the present invention is installed on the right end face of an existing motor 1 for winding the rolling door, comprising, in sequence from the right end to the left end of the rotating shaft 101 of a motor 1, a chain sprocket 2, and intermediate disk 3 and a brake release lever mechanism 4.

Figure 3:
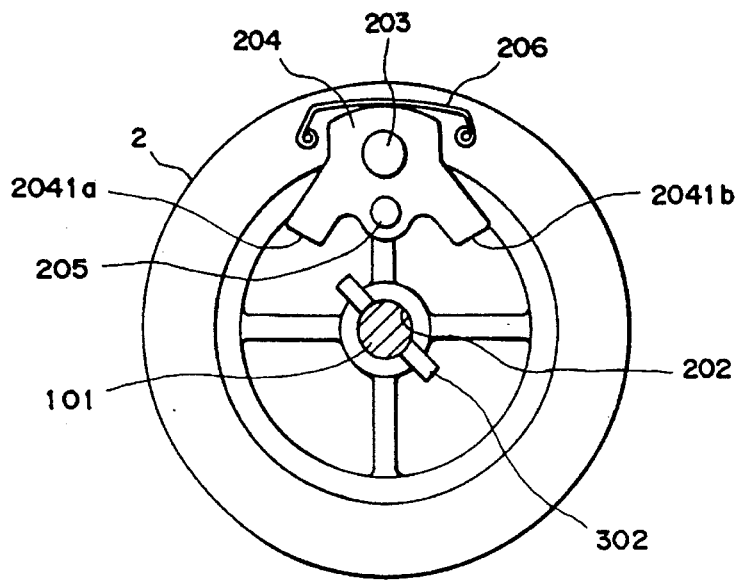
FIG. 3 is a left end view of the chain sprocket as shown in direction A—A of FIG. 2 wherein the chain is omitted.

As shown in FIGS. 1 and 2, the chain sprocket 2 loosely fitted on the rotating shaft 101 is provided, and around the sprocket circumference, a series of conventional chain loop grooves being orthogonal in alternation for receiving the chain loop units of a pulling chain 201 are also provided. Thus, the chain sprocket 2 fitted over the rotating shaft 101 of the motor 1 can be rotated freely by pulling the chain 201. Referring further to FIG. 3, the left end view of the chain sprocket 2 as seen in direction A—A of FIG. 2, the center of the chain sprocket 2 has a shaft hole 202 into which the rotating shaft 101 is loosely fitted for free rotation. A triggering plate 204 is pivoted near the peripheral edge adjacent to the chain sprocket 2 by a pin 203. A pair of branch legs 2041a, 2041b are formed respectively on the lower left and right corners of the triggering plate 204, a long actuating pin 205 projected from the end face of the triggering plate 204 being fixed immediately therebelow, and the triggering plate 204 being acted upon by spring means, for example, being pressed against at the top end by a leaf spring 206.

Figure 4:
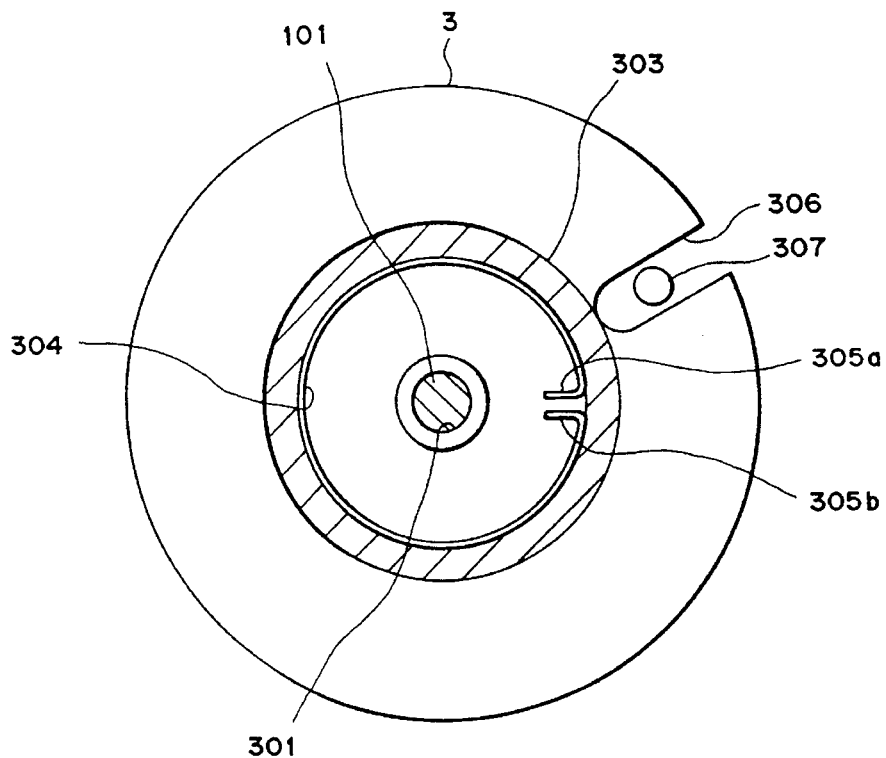
FIG. 4 is a front elevation view of the intermediate disk and acent members as shown in direction B—B of FIG. 2, wherein the projected cylinder portion in the middle is sectioned off.

FIG. 4 shows the end view of the intermediate disk 3 as seen from direction B—B of FIG. 2. In the center of the intermediate disk 3 is a central hole 301 having a diameter slightly larger than the rotating shaft 101 for loose fitting and a raised high cylinder 303 is formed on the intermediate disk 3. A linkage pin 302 being radially inserted into the rotating shaft 101 above the raised high cylinder 303 of the disk 3 and with both ends being projected outside the rotating shaft 101. A ring groove being formed on the inner wall of the cylinder 303, friction means such as a compressible friction ring 304 are fitted thereinto. Both ends of the friction ring 304 are bent radially toward the center to form into a pair of blocking arms 305a, 305b. After said chain sprocket 2 is fitted over the rotating shaft 101, the moving trail of the actuating pin 205 thereon lies within the length range to which the blocking arms 305a, 305b are extended. In addition, an elongate slide groove 306 is formed radially inwardly from the periphery of the intermediate disk 3 all the way to the outer wall of the flange 303, a pin 307 being received in the elongate slide groove 306. The function of the pin 307 will be described in detail hereinafter.

FIG. 7 shows the brake release lever mechanism 4 and the original power-off release device 5 which can be actuated thereby as seen from direction C—C in FIG. 2. The power-off release device 5 has been described in my granted ROC Patent Application No. 81216990 entitled "POWER OFF RELEASE DEVICE FOR SAFE ELECTRIC ROLLING DOORS", wherein an actuation braking lever 503 can be actuated by a plunger 502 of a solenoid valve 501, causing a cam pin 601 on the conventional brake assembly 6 to rotate. The brake release lever mechanism 4 according to the present invention comprises an actuating lever 401 connected to the extended end of the actuation braking lever 503, the other end of the actuating lever 401 extending vertically down; an intermediate lever 402 with one end being pivoted and the other end portion always abutting the end of the actuating lever 401 via a spring 403; a brake release lever 404 below the intermediate lever 402 with one end being pivoted near an intermediate portion of the intermediate lever 402, and a pair of upwardly inclined wing plates 4041a, 4041b being connected to this pivoted end, the other end being bent up with said pin 307 secured at a distal position for insertion into the elongate slide groove 306 of the intermediate disk 3.

Figure 5:
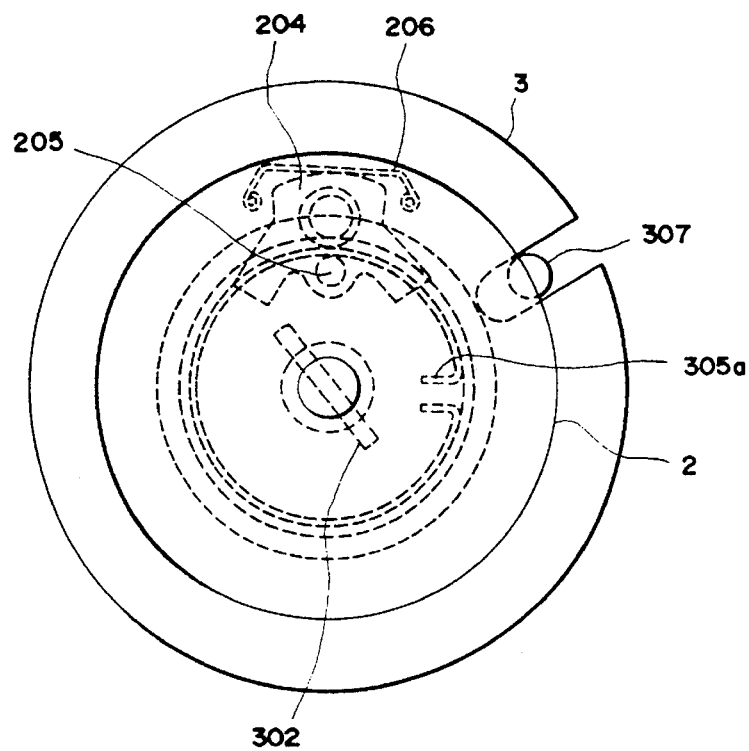
FIG. 5 is right side view of FIG. 2 wherein the chain around the chain sprocket is omitted.
Figure 6:
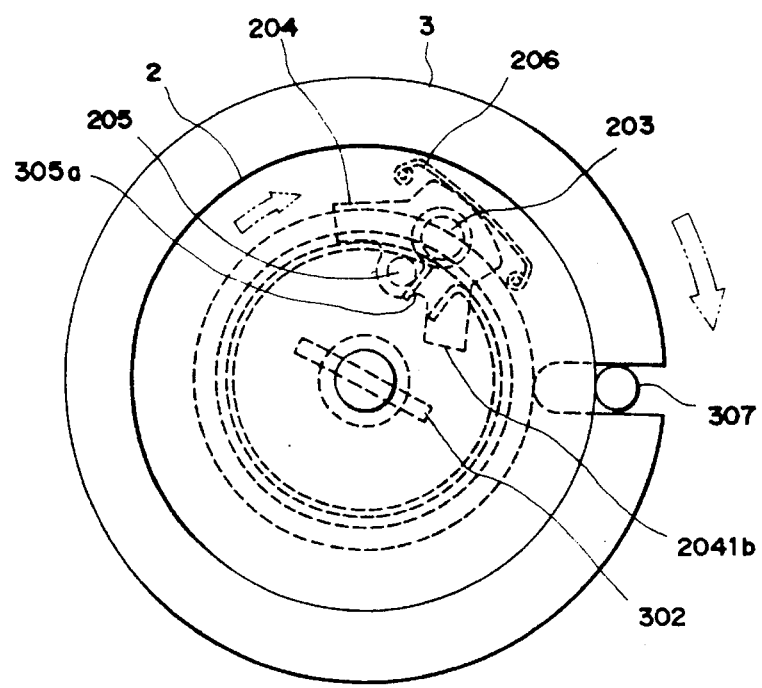
FIG. 6 shows a midway position from the position in FIG. 5 when the chain sprocket is rotated by exerting force illustrating the relation of space positions among related members.

The rolling-up operation of the present invention during power off will be described hereinafter. Since there is no power for the motor 1 to rotate and hence no electromagnetic force for the solenoid valve 501 such that the plunger 502 is pulled out under the action of the spring 403, causing the cam pin 601 to swing, thus applying brake on the rotating shaft 101 of the motor 1. Under this power off condition, when it is desired to open the door, the operator only has to apply force on either side of the chain 201 to pull the chain down, causing the chain sprocket 2 to rotate clockwise as seen in FIG. 5. As shown in FIG. 6, when the actuating pin 205 on the chain sprocket 2 follows to rotate with the chain sprocket 2, the pin 205 will finally come into contact with the blocking arm 305a of the friction ring 304 on the intermediate disk 3. As the operator keeps on pulling the chain 201, the intermediate disk 3 will rotate together by the exertion on the friction ring 304. In the meantime, the triggering plate 204 on the chain sprocket 2 also resists against the leaf spring 206 acting thereupon to deflect clockwise about the pin 203 and follows the rotating intermediate disk 3 to move the pin 307 radially outwardly along the elongate slide groove 306 by pressing the pin 307. As shown in FIG. 7, then the brake release lever 404 secured integrally to the pin 307 is forced to swing down pivotally, causing one wing plate 4041b to swing up and press against an intermediate portion of the intermediate lever 402, causing the intermediate lever 402 to swing up, pivotally, such that the actuating lever 401 is pushed up by opposing against the spring 403, making the cam pin 601 to rotate in reverse direction, thus releasing the braking force on the rotating shaft 101 of the motor 1.

As shown in FIG. 6, when the intermediate disk 3, driven together by the actuating pin 205 on the triggering plate 204 of the chain sprocket 2 via the blocking arm 305a of the friction ring 304, can no longer rotate as the cam pin 601 has been rotated to a limit position, the triggering plate 204 is prevented from rotating with the chain sprocket 2, but the friction ring 304 may overcome the friction resistance between the ring 304 and the intermediate disk 3, causing the friction ring 304 to slide on the inner wall of the cylinder 303 and the triggering plate 204 to deflect further against the leaf spring 206 acting thereupon and be brought into a midway position as shown in FIG. 6. Since the branch leg 2041b which has been deflected extends to a distance within the moving range of the linkage pin 302, the top end surface of the branch leg 2041b can finally turn to press against the linkage pin 302. Since the brake on the rotating shaft 101 (to which the linkage pin 302 is anchored) is previously released as mentioned above, when the chain sprocket 2 is further rotated by pulling the pulling chain 201, the rotating shaft 101 will be caused to rotate by the branch leg 2041b acting on the linkage pin 302. A barrel (not shown), around which a curtain of slates is rolled, is rotated by the rotating shaft 101 (shown to the left in FIG. 2) through a conventional coupling means and the curtain will be rolled up to open the door. The barrel and its rotating mechanism are too well known to describe herein. During the process when the chain 201 is pulled, if external force is released to stop pulling the chain 201, the spring 403 will turn the cam pin 601 back to brake the rotating shaft 101 again and make the rotating shaft 101 to stay wherever it is. Then, if the operator continues to pull the chain 201, the aforementioned process will be repeated from there on, the rotating shaft 101 is released, actuating the linkage pin 302 to drive the rotating shaft 101 to roll the curtain up, and the door being opened wider.

On the other hand, if the operator pulls on the other side of chain 201 to open the door, the intermediate disk 3 will be rotated in the direction opposite the above direction, i.e., counterclockwise. Referring to FIG. 7, the pin 307 will swing counterclockwise, thus the other wing plate 4041b will press against the middle portion of the intermediate lever 402, causing it to swing up to release the braking force on the rotating shaft 101. That is to say, after the chain sprocket is stopped in the midst of the way, the chain can be pulled in the other direction to open the door when the operator applies force again.

Figure 8:
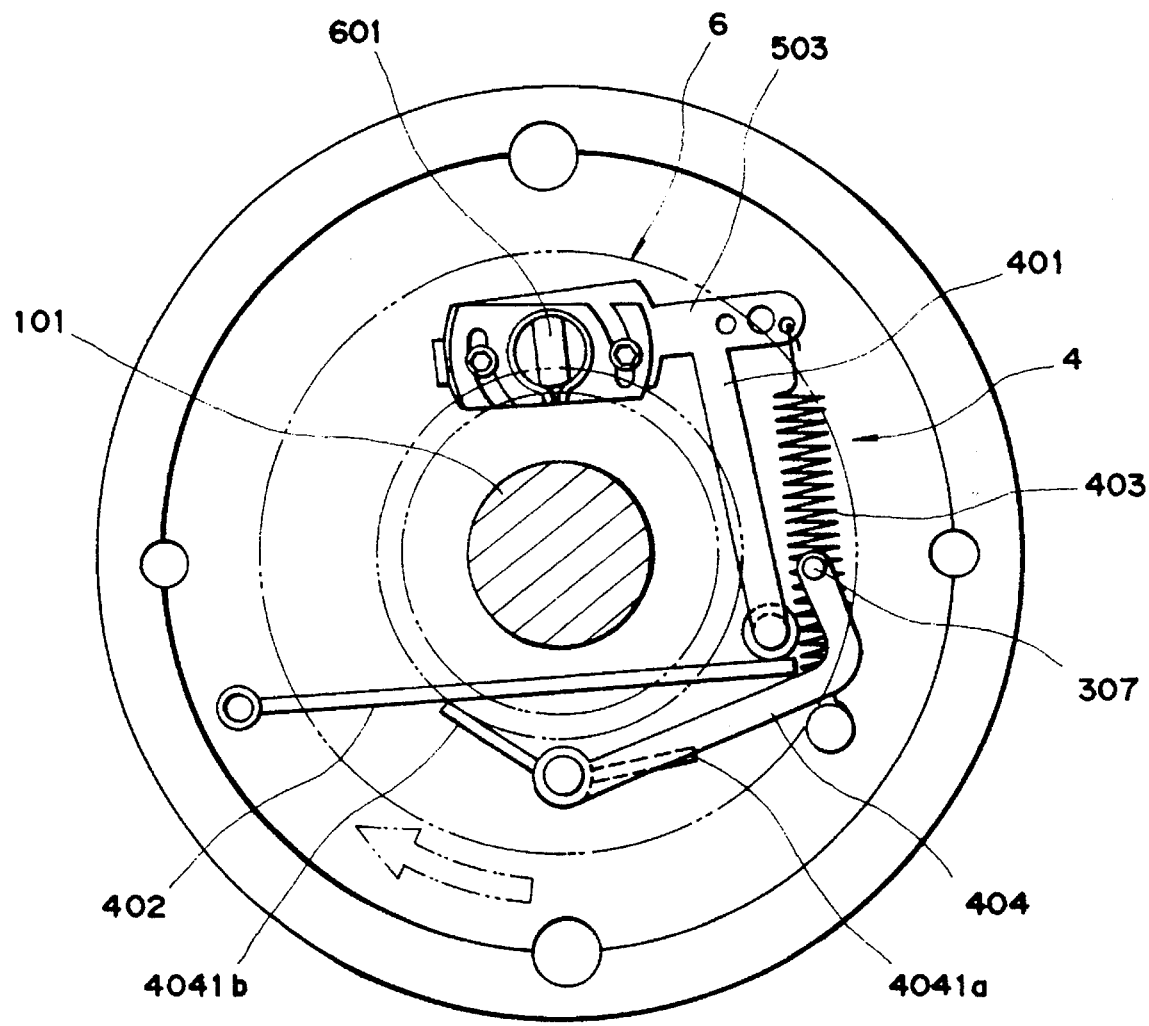
FIG. 8 is a a view similar to FIG. 7 wherein, without providing with a solenoid, the second embodiment is adapted to hand-operated rolling doors.

The present invention can also be adopted to hand-operated devices for rolling doors. As shown in FIG. 8, unless an electrical motor and a solenoid are provided, the other components are all the same as shown in FIG. 7. The motion force to rotate the rotating shaft 101', and roll up the curtain is now performed by pulling the chain by hand, not with the motor as described above. Referring to FIG. 8, when a curtain (not shown) is at its upper dead position or at lower one or stopped at a midway therebetween, the spring 403 always pulls the actuation braking lever 503 to the effect that cam pin 601 can rotate to brake a shaft 101'. As stated above, when the operator pulls with hands the chain 201 (shown in FIG. 1) at either side, the intermediate lever 402 pushes the actuating lever 401 upward and releases the brake of rotating shaft 101', then a barrel can be rotated by the rotation of the sprocket to roll up a curtain which is rolled around the barrel. A curtain can be rolled up with one hand only, so long as this invention is adopted to a conventional hand-operated driver for rolling door.

From the foregoing, while the bi-directional clutch type chain pulling device for electric rolling doors according to the present invention has been described, it is to be noted that the preferred embodiments described hereinbefore are only illustrative and modifications and of the embodiments, as well as other embodiments can be readily occurred to those skilled in the art. Therefore, the present invention is intended to cover all such modifications, changes, and embodiments falling within the scope as defined in the appended claims.

I claim:

1. A bi-directional clutch type chain pulling device for rolling doors and for actuating a cam pin of a drum brake assembly, comprising a rotating shaft, a chain sprocket, an intermediate disk, a brake release lever mechanism, and a triggering plate, said chain sprocket being loosely fitted on said rotating shaft and having a center hole for insertion of said rotating shaft and having a peripheral edge, said triggering plate being pivoted away from said center hole on said peripheral edge of said sprocket, said triggering plate having lower left and right sides and an end face, a pair of branch legs being formed on said lower left and right sides, a projecting actuating pin being fixed on said end face, said triggering plate being actuated by spring means, said intermediate disk having a raised concentric cylinder, a periphery and an end face and a central hole for loose fitting of said rotating shaft, a linkage pin being radially inserted into said rotating shaft and above said raised cylinder, said raised cylinder having an inner wall, a ring groove being formed on said inner wall, means for applying friction arranged in said inner groove and said projecting actuating pin of said triggering plate acting on said means for applying friction, said concentric cylinder having an outer wall, an elongated slide groove being formed radially from said periphery of said intermediate disk to said outer wall of said concentric cylinder, said brake release lever mechanism comprising an actuating lever, a brake release lever, an intermediate lever and a cam pin, said actuating lever having two ends, said intermediate lever having two ends and an intermediate portion, said brake release lever having an extended end portion and a second end, said actuating lever having one first end connected to said cam pin, said intermediate lever having one end pivoted, another end abutting said second end of said actuating lever; said brake release lever having one end pivoted on a lower portion near said intermediate portion of said intermediate lever, a pair of wing plates upwardly inclined connected to said pivoted end of said brake release lever, and a pin parallel to said rotating shaft secured to said second end of said brake release lever and received in said elongated slide groove of said intermediate disc.

2. The bi-directional clutch type chain pulling device for rolling doors as set forth in claim 1, wherein said spring means acting on said triggering plate is a leaf spring which abuts against the said triggering plate.

3. The bi-directional clutch type chain pulling device for rolling doors as set forth in claim 1, wherein said elongate slide groove on the intermediate disk is formed radially outwardly.

4. The bi-directional clutch type chain pulling device for rolling doors as set forth in claim 1, wherein said means for applying friction is a friction ring, said friction ring having two ends, both ends of said friction ring being bent into a pair of blocking arms.

5. The bi-directional clutch type chain pulling device for rolling doors as set forth in claim 1, wherein said rotating shaft is rotated by an electrical motor and the device contains a solenoid valve, said solenoid valve has a plunger connected with said actuating lever.

6. The bi-directional clutch type chain pulling device for rolling doors as set forth in claim 1, wherein said rotating shaft rotates when the user exerts force with one hand on said chain sprocket.

* * * * *